D. G. PHILLIPS.
LINE CLAMP FOR FISHING FLOATS.
APPLICATION FILED MAR. 10, 1917.
1,232,390.
Patented July 3, 1917.
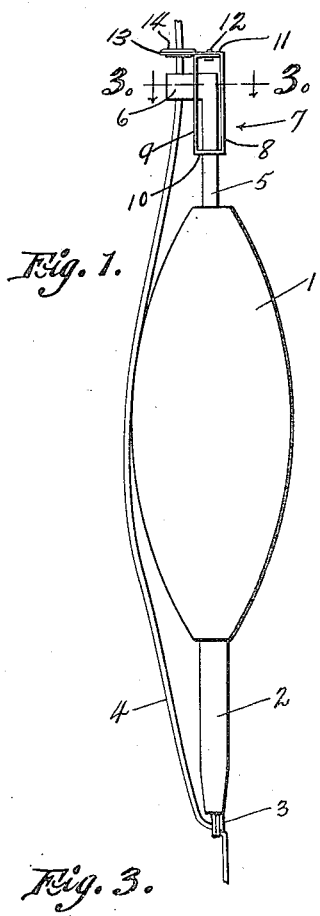
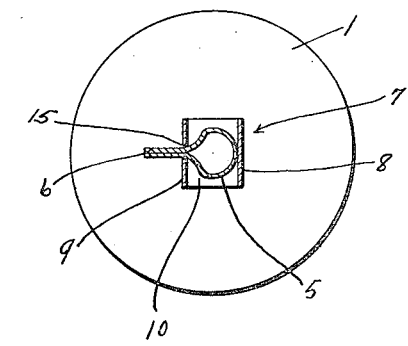
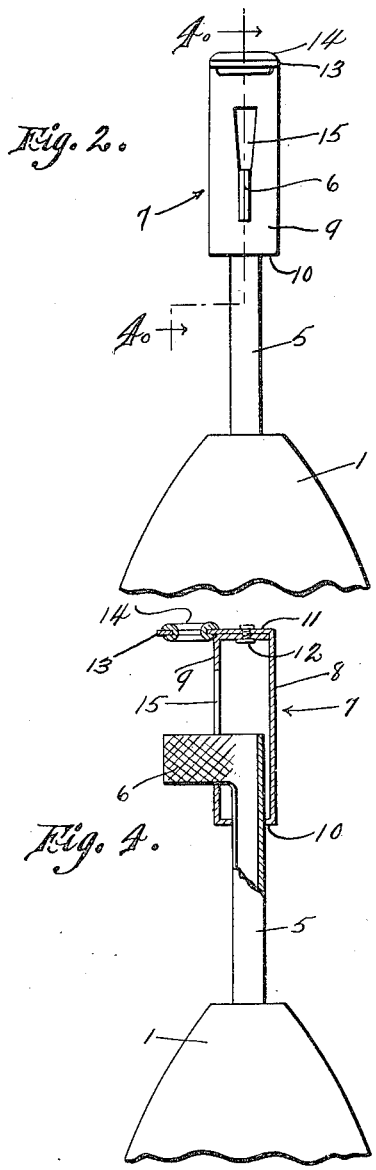
D. G. Phillips
Inventor

UNITED STATES PATENT OFFICE.

DAVID G. PHILLIPS, OF MACON, GEORGIA.

LINE-CLAMP FOR FISHING-FLOATS.

1,232,390.

Specification of Letters Patent.

Patented July 3, 1917.

Application filed March 10, 1917. Serial No. 153,889.

*To all whom it may concern:*

Be it known that I, DAVID G. PHILLIPS, a citizen of the United States, residing at Macon, in the county of Bibb and State of Georgia, have invented a new and useful Line-Clamp for Fishing-Floats, of which the following is a specification.

The present invention relates to a device adapted for use upon fishing floats and kindred articles for adjustably holding or clamping a fishing line or the like, and aims to provide a novel and improved device of that character which will enable the float and line to be adjusted relatively according to the depth of fishing desired, the device being operable to release the line when it is wound up to bring the float against the pole, so that the line can move past the float to be wound up or reeled in completely up to the end of the pole.

It is also the object of the invention to provide a line clamp which can be readily applied to various floats and the like, and which is simple and inexpensive in construction, as well as being practical and efficient in use.

With the foregoing and other objects in view which will appear as the description proceeds, the invention resides in the combination and arrangement of parts and in the details of construction, hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a side elevation of the device as applied to a fishing float.

Fig. 2 is an enlarged front view of the device.

Fig. 3 is an enlarged cross section on the line 3—3 of Fig. 1.

Fig. 4 is a section on the line 4—4 of Fig. 2.

In the drawing, there is illustrated a fishing float 1 having the depending spindle 2 at its lower end provided with an eye or guide 3 for the line or cord 4.

The present clamp is carried by the upper end of the float, and embodies an upstanding tubular spindle or post 5 engaged with the upper end of the float. This tubular spindle 5 is provided at its upper free end with a pair of outstanding laterally projecting jaws 6 between which the line is adapted to pass. Said jaws tend to spring apart when they are released, and preferably have their adjacent sides roughened to effectively grip the line.

An elongated open slide 7 is slidable upon the spindle 5, and is bent from a strip of metal to provide the parallel longitudinal portions 8 and 9 at the opposite sides of the spindle connected at one end by the yoke 10 which is apertured to slide upon the spindle, so that the spindle projects into the slide. The terminals of the strip are overlapped, as at 11, at the other end of the portions 8—9 and are secured together by a rivet 12 or other securing element. One of the terminals of the strip is extended laterally to provide the tongue 13, and an eyelet 14 is preferably engaged through said tongue to guide the line therethrough. The portion 9 of the slide has a longitudinal slot 15 tapered from its upper to its lower end, and the jaws 6 project through said slot.

In use, when the slide 7 is moved downwardly toward the float, this will bring the upper wider end of the slot 15 adjacent to the jaws, allowing said jaws to separate and this will release the line so that the line and pole can be adjusted relatively. When the float is brought to the desired position on the line, the slide 7 is raised or forced away from the float, and the converging edges of the slot 15 will therefore force the jaws 6 toward one another to grip the line and hold the line and float in relatively fixed position. When the line is reeled in, the tongue 13 and corresponding end of the slide will contact with the pole, thereby stopping the movement of the slide 7, and the line being gripped by the jaws 6 will cause said jaws to be pulled toward the tongue 13, thereby pulling the spindle 5 and float 1. The jaws 6 are thus pulled into the wider end of the slot 15, so that the jaws separate and release the line. This permits the line to be entirely reeled in until the sinker or hook reaches the float.

Having thus described the invention, what is claimed as new is:—

1. A device of the character described embodying a float, a spindle carried thereby having a pair of separable line gripping jaws, and a slide movable upon the spindle and having means to force the jaws toward one another when the slide is moved away from the float, said slide having a line guide beyond said jaws.

2. A line clamp embodying two relatively movable members, one having a pair of separable jaws to grip a line, and the other having a tapered slot through which said jaws project and to force said jaws toward one another when the members are moved in one direction relatively.

3. A line clamp embodying a pair of relatively movable members, one having a pair of separable jaws to grip a line, the other having a guide for the line, and a tapered slot through which the jaws project, the wider end of the slot being nearest said guide.

4. A line clamp embodying a spindle having a pair of separable line gripping jaws, and an open elongated slide having one end slidable upon the spindle, and having a longitudnial portion provided with a tapered slot through which the jaws project, the other end of the slide having a line guide.

In testimony that I claim the foregoing as my own, I have hereto affixed my signature in the presence of two witnesses.

DAVID G. PHILLIPS.

Witnesses:
C. WILEY,
B. B. REINTZ.

Copies of this patent may be obtained for five cents each, by addressing the "Commissioner of Patents, Washington, D. C."